US009886527B2

(12) United States Patent
Bauschke et al.

(10) Patent No.: US 9,886,527 B2
(45) Date of Patent: Feb. 6, 2018

(54) DETERMINING FEASIBLE SPLINES WITH ENGINEERING CONSTRAINTS USING PROJECTION METHODS

(71) Applicant: Autodesk, Inc., San Rafael, CA (US)

(72) Inventors: Heinz H. Bauschke, Kelowna (CA); Valentin R. Koch, Kelowna (CA)

(73) Assignee: Autodesk, Inc., San Rafael, CA (US)

( * ) Notice: Subject to any disclaimer, the term of this patent is extended or adjusted under 35 U.S.C. 154(b) by 1059 days.

(21) Appl. No.: 14/157,421

(22) Filed: Jan. 16, 2014

(65) Prior Publication Data

US 2014/0200864 A1   Jul. 17, 2014

Related U.S. Application Data

(60) Provisional application No. 61/753,338, filed on Jan. 16, 2013.

(51) Int. Cl.
*G06F 17/50* (2006.01)

(52) U.S. Cl.
CPC .......... *G06F 17/50* (2013.01); *G06F 2217/06* (2013.01)

(58) Field of Classification Search
CPC .............................. G06F 17/50; G06F 2217/06
See application file for complete search history.

(56) References Cited

U.S. PATENT DOCUMENTS

| 6,996,507 | B1 * | 2/2006 | Myr ..................... G06F 17/5004 172/1 |
| 7,551,180 | B2 * | 6/2009 | Schaffer .............. G06F 17/5004 345/419 |
| 8,321,181 | B2 * | 11/2012 | Detwiler ................ G06Q 10/04 703/1 |
| 9,127,948 | B2 * | 9/2015 | Sandoval ............... G01C 21/20 |
| 2006/0034365 | A1 * | 2/2006 | Song ..................... H03F 1/3223 375/238 |
| 2009/0198505 | A1 * | 8/2009 | Gipps .................. G06Q 10/047 705/1.1 |
| 2013/0080124 | A1 | 3/2013 | Koch |

OTHER PUBLICATIONS

Easa, Said M., and Fujian Wang. "Estimating continuous highway vertical alignment using the least-squares method." Canadian Journal of Civil Engineering 37, No. 10 (2010): 1362-1370.*

(Continued)

*Primary Examiner* — Aniss Chad
(74) *Attorney, Agent, or Firm* — Gates & Cooper LLP

(57) ABSTRACT

A method, apparatus, system, and computer program product provide the ability to modify a spline (e.g., a civil engineering spline). The spline, defined by a set of connected points, is obtained/acquired. A design constraint set is determined and may include an interpolation constraint (specifying a fixed elevation for a connected point), a slope constraint (specifying a bound on a slope between two of the connected points), and a curvature constraint (specifying; a maximum slope difference of a first slope and a second slope between three connected points). The spline is projected onto the design constraint set thereby modifying the spline by changing elevations of the connected points. The modified spline is then projected onto the design constraint set iteratively until the spline satisfies all constraints in the design constraint set.

20 Claims, 6 Drawing Sheets

(56) References Cited

OTHER PUBLICATIONS

Rahman, Md. "Optimizing the vertical alignment under earthwork block removal constraints in road construction." PhD diss., University of British Columbia, 2013.*

A policy on geometric design of highways and streets: 2001. American Association of State Highway and Transportation Officials, pp. 235-282, 2001.

Kazuhiro Aruga, John Sessions, and Abdullah E. Akay. Heuristic planning techniques applied to forest road profiles. Journal of Forest Research, 10(2):83-92, 2005.

Deryl Burch. Estimating Excavation. Craftsman Book Company, 1st. edition, pp. 82-83, 1997.

E P Chew, C J Goh, and T F Fwa. Simultaneous optimization of horizontal and vertical alignments for highways. Transportation Research Part B: Methodological, 23(5):315-329, 1989.

David H Douglas and Thomas K Peucker. Algorithms for the reduction of the number of points required to represent a digitized line or its caricature. Cartographica: The International Journal for Geographic Information and Geovisualization, 10(2):112-122, 1973.

Said M Easa. Selection of roadway grades that minimize earthwork cost using linear programming. Transportation Research. Part A: general, 22(2):121-136, 1988.

Konrad Ebisch. A correction to the Douglas-Peucker line generalization algorithm. Computers & Geosciences, 28(8):995-997, 2002.

Nicolas Hansen. The CMA evolution strategy: a comparing review, StudFuzz 192, 75-102 (2006).

N Hansen and A Ostermeier. Completely derandomized self-adaptation in evolution strategies. Evolutionary Computing, 9(2):159-195, 2001.

J Jong and P Schonfeld. An evolutionary model for simultaneously optimizing three-dimensional highway alignments. Transportation Research Part B: Methodological, 37(2):107-128, Feb. 2003.

Valentin R Koch and Yves Lucet. A note on: Spline technique for modeling roadway profile to minimize earthwork cost. Journal of Industrial and Management Optimization, 6(2):393-400, May 2010.

Jon Kleinberg and Eva Tardos. Algorithm Design. Pearson Education, Inc., 1st. edition, pp. 261-266, 2006.

Yusin Lee and Juey-Fu Cheng. Optimizing highway grades to minimize cost and maintain traffic speed. Journal of Transportation Engineering, 127(4):303-310, Jul./Aug. 2001.

Yusin Lee, You-Ren Tsou, and Hsiao-Liang Liu. Optimization method for highway horizontal alignment design. Journal of Transportation Engineering, 135(4):217-224, Apr. 2009.

Ahmad A Moreb. Linear programming model for finding optimal roadway grades that minimize earthwork cost. European Journal of Operational Research, 93(1):148-154, Aug. 1996.

Ahmad A Moreb. Spline technique for modeling roadway profile to minimize earthwork cost. Journal of Industrial and Management Optimization, vol. 5 No. 2, pp. 275-283, May 2009.

D Trietsch. A family of methods for preliminary highway alignment. Transportation Science, 21(1):17-25, Feb. 1987.

Bauschke, Heinz H., et al., "Convex Analysis and Monotone Operator Theory in Hilbert Spaces", Springer, 2011, ISBN 978-1-4419-9466-0.

Bellman, Richard, "On the approximation of curves by line segments using dynamic programming", Communications of the ACM, 4(6) (1961), 284.

Herman, Gabor T., et al., "A fast algorithm for solving a linear feasibility problem with application to intensity-modulated radiation therapy", Linear Algebra and its Applications, 428 (2008), 1207-1217.

* cited by examiner

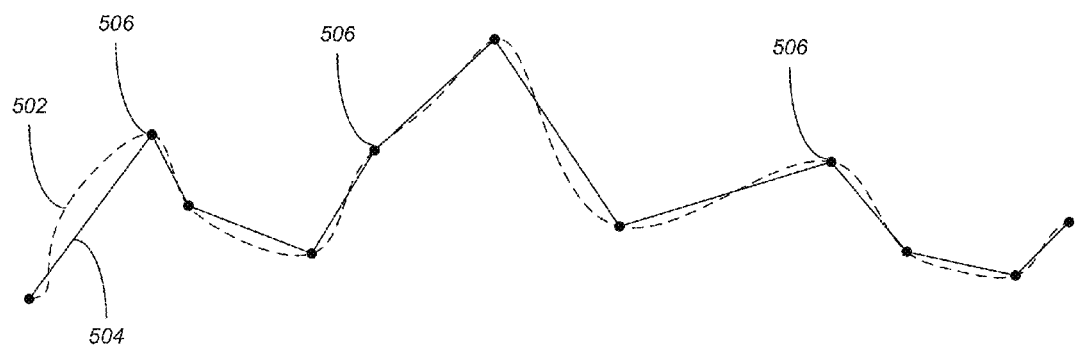
*FIG. 5*
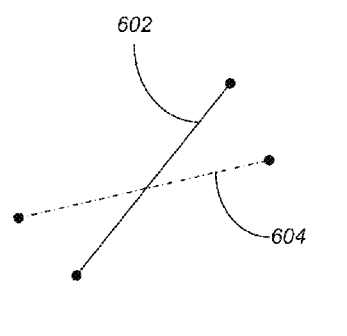 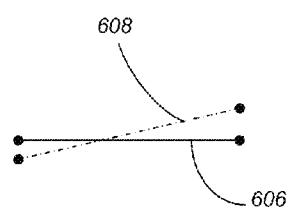 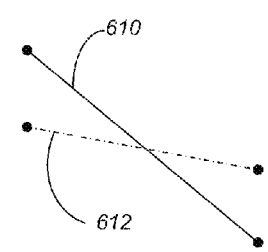
*FIG. 6A*  *FIG. 6B*  *FIG. 6C*

DETERMINING FEASIBLE SPLINES WITH ENGINEERING CONSTRAINTS USING PROJECTION METHODS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

U.S. Patent Application Ser. No. 61/753,338, entitled "PROJECTION METHODS FOR SOLVING FEASIBILITY AND BEST APPROXIMATION PROBLEMS WITH HALFSPACES", filed on Jan. 16, 2013, by Heinz H. Bauschke and Valentin R. Koch.

This application is related to the following co-pending and commonly-assigned patent application, which application is incorporated by reference herein:

U.S. patent application Ser. No. 13/626,451, entitled "ROAD DESIGN OPTIMIZATION", filed on Sep. 25, 2012, now U.S. Pat. No. 9,477,789, issued on Oct. 25, 2016, by Valentin R. Koch, which application claims priority to U.S. Provisional Application Ser. No. 61/539,793, entitled "ROAD DESIGN OPTIMIZATION", filed on Sep. 27, 2011, by Valentin R. Koch.

BACKGROUND OF THE INVENTION

1. Field of the Invention

The present invention relates generally to road design, and in particular, to a method, apparatus, and article of manufacture for defining a vertical road profile design with engineering constraints.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

In road design, computer aided design (CAD) users try to draw road profiles that follow the existing ground as close as possible. This reduces the overall earthwork costs (cut and fill). However, in most cases, there are design constraints that need to be imposed on the profile, such as (1) maximum positive and negative grades, (2) minimal required grade for drainage (no flat sections allowed), (3) maximum grade change, and (4) the profiles need to go through some fixed points (intersections with other roads, etc.).

Often times, an initial design that follows the ground closely does not respect all of the constraints described above (e.g., infeasible with respect to one or more constraints). Prior art methods attempt to impose such constraints on an existing profile using linear programming (LP). An example of such a method is given in the publication "A note on: Spline technique for modeling roadway profile to minimize earthwork cost", by Valentin Koch and Yves Lucet, Volume 6 (2), pages 393-400, Journal of Industrial and Management Optimization (Published March 2010). Some of the constraints (e.g., constraints 1, 3, and 4) can be incorporated as linear constraints into an LP. However, constraint (2) is not linear and can therefore not be added to an LP. A possible way to solve the problem with constraint (2) would be with the help of a mixed-integer linear program (MIP). There are several disadvantages for using a MIP. First, a MIP can be very slow and can take up to hours to solve large problem instances. Second, a MIP requires sophisticated solver software (often commercially licensed) to solve the problem.

In an LP approach, one uses linear equations and a complex algorithm such as the simplex algorithm or interior-point methods, to solve the problem. In a MIP approach, one adds integer variables to linear equations. In a MIP, the same algorithms as in an LP are used, but in a procedure called branch-and-bound, where an LP is solved thousands or millions of times. This makes the MIP approach very slow.

In view of the above, what is needed is a fast and accurate method for determining and modifying a spline to comply with a set of design constraints. In particular, it is desirable to use a method, apparatus, and system that can modify a civil engineering spline while satisfying a set of constraints that are both linear and non-linear.

SUMMARY OF THE INVENTION

Embodiments of the invention acquire an initial design/spline that follows the ground closely, but that does not respect all of the constraints (i.e., infeasible with respect to one or more constraints). The design is either altered such that it becomes feasible, or an indication is provided that there may be no profile that will satisfy all of the constraints.

BRIEF DESCRIPTION OF THE DRAWINGS

Referring now to the drawings in which like reference numbers represent corresponding parts throughout:

FIG. 5 illustrates an exemplary vertical road profile in accordance with one or more embodiments of the invention;

FIGS. 6A-6C illustrate different slope bounds that may be utilized as constraints in accordance with one or more embodiments of the invention.

DETAILED DESCRIPTION OF THE PREFERRED EMBODIMENTS

Figure 1:
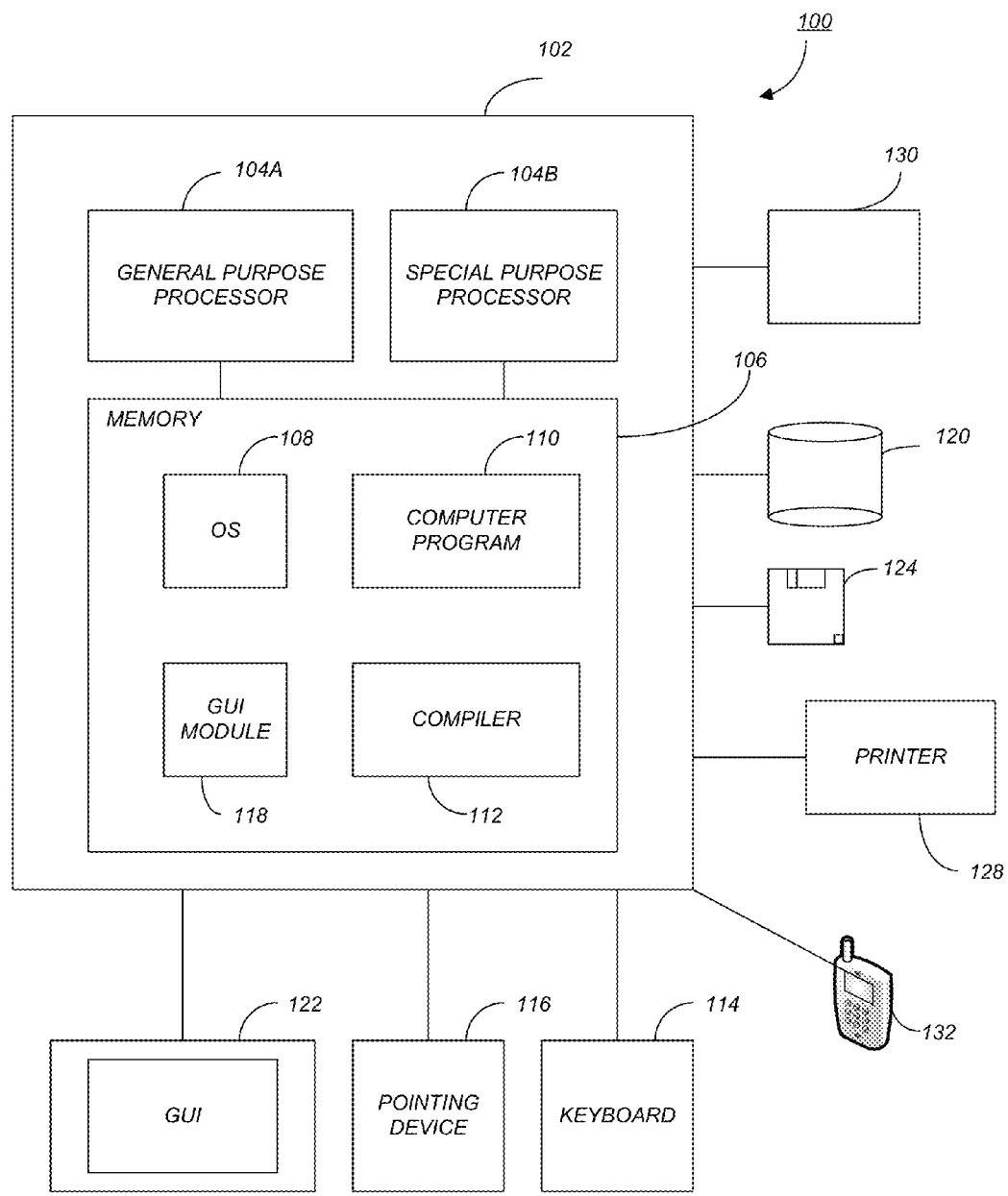
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention are extremely simple to implement and do not require any additional solver software. Instead of using simple equations for the design constraints, the constraints are formulated as mathematical sets. These sets are used in conjunction with mathematical projections and fixed-point methods to find solutions. Such solutions can be found in a few hundred iterations, and every iteration is very fast to execute. The parallel nature of the fixed-point method allows for the potential use of GPU (Graphics Processing Unit) resources, which may render the processing extremely fast. Such processing is important in the context of horizontal roadway optimization, where finding feasible profiles may occur millions of times within a single optimization run.

A road profile can be drawn as a curve that consists of piecewise connected lines. In computer graphics and mathematics, such a curve is called a spline. The spline can be defined by the intersection points of these lines (i.e., a series of connected points). In road design, these points are called Points of Vertical Intersection (PVI). In addition, embodiments of the invention may utilize ground points instead of PVIs.

Design constraints are formulated with mathematical equations that use the positions of the connected points as variables. These equations divide the feasible positions into four mathematical sets, where each set represents one of the constraints. Mathematical projections are then used. A graphical projection in CAD is the process where one projects a three dimensional object on a two dimensional surface. A mathematical projection is a generalization of such a process. A mathematical projection is a mapping of one or multiple variables onto a set. In fact, a mathematical projection provides the point that is nearest in the set to the given variables.

Embodiments of the invention obtain/acquire a spline (e.g., a CAD user may provide an existing spline through a list of PVIs). By formulating the constraints as sets, the spline is projected on each constraint set individually. However, if the spline profile is projected onto the constraint set that represents one constraint, the resulting/modified spline may not satisfy the other constraints (i.e., in a design constraint set).

Embodiments of the invention utilize an alternating fixed-point method that projects a variable onto the first constraint. It then uses the result and projects it onto the second constraint. It then projects from the second constraint to the third constraint, and proceeds through all of the constraints in a constraint set. The method then starts the next iteration where it projects onto the first set again, etc. If the constraints have certain mathematical properties, then the method will reach/converge on a solution that satisfies all the constraints after a number of iterations. Besides the alternating method, there are many other fixed-point methods to find a solution (parallel, Douglas-Rachford, etc.) that may be used in accordance with embodiments of the invention (e.g., see 'Convex Analysis and Monotone Operator Theory in Hilber Spaces' by Heinz Bauschke and Patrick Combettes (Springer, 2011), which is incorporated by reference herein.

Embodiments of the invention utilize constraint formulations together with some carefully selected fixed-point algorithms to try and convert the given spline (e.g., road profile) into a modified spline that satisfies the design constraints. Most splines such as road profiles may be converted in a few hundred iterations, and have the resulting spline/road as close as possible to the original one. In some cases, the method is not able to find a solution immediately. With the help of error analysis, the method may suggest (but does not guarantee) to the user that there is no feasible solution for the given constraints. In such a case, a designer will then adapt the constraints or the existing spline/road profile.

Hardware Environment

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
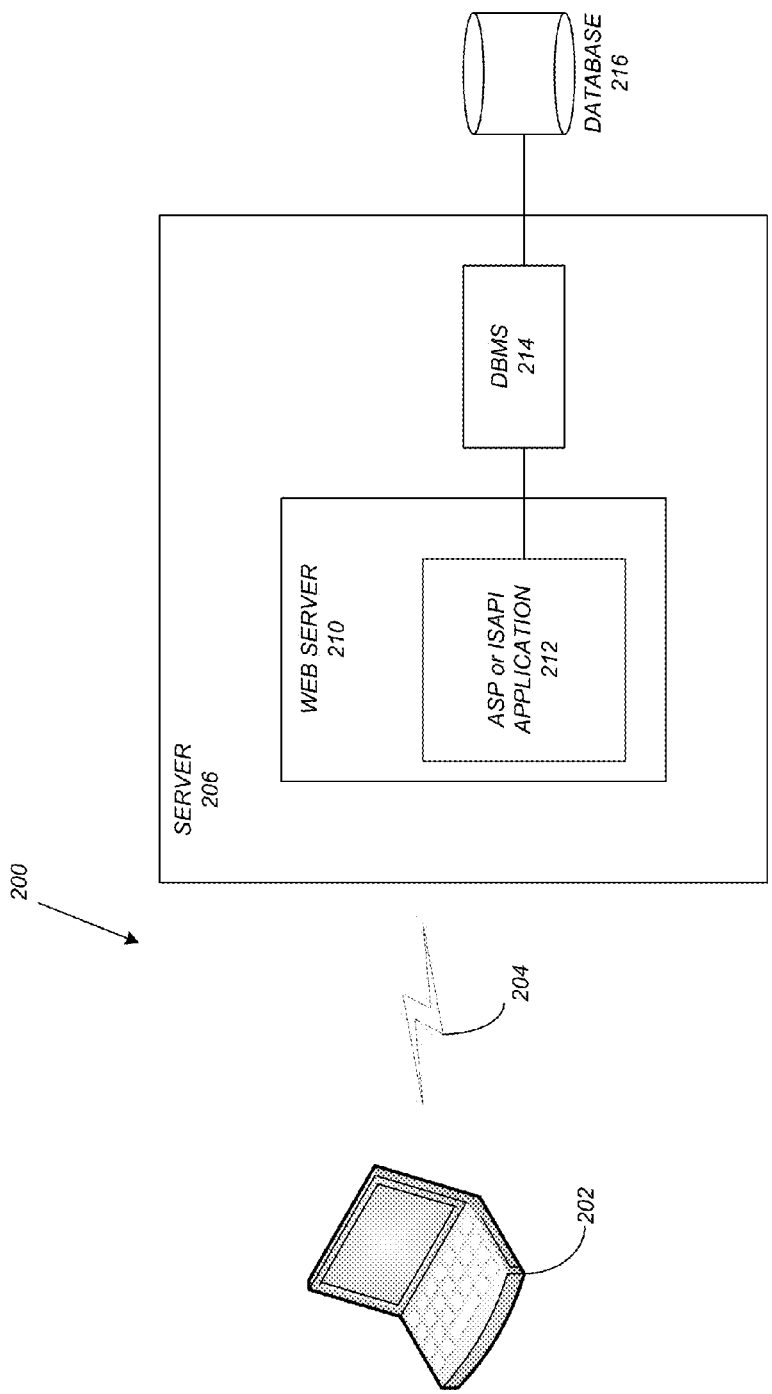
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Embodiments of the invention are implemented as a software application on a client 202 or server computer 206. Further, as described above, the client 202 or server computer 206 may comprise a thin client device or a portable device that has a multi-touch-based display.

Overview

Abstract Formulation of the Problem

One may assume that $n \in \{2, 3, \ldots\}$ and that $$X = \mathbb{R}^n \text{ with standard inner product } \langle \cdot, \cdot \rangle \text{ and induced norm } \|\cdot\|. \tag{1}$$

One may also assume n strictly increasing breakpoints are given on the real line:

$$t = (t_1, \ldots, t_n) \in X \text{ such that } t_1 < \ldots < t_n. \tag{2}$$

The goal is to find a vector $x = (x_1, \ldots, x_n) \in X$ \hfill (3)

such that $(t_1, x_1), \ldots, (t_n, x_n)$ satisfies a given set of constraints. \hfill (4)

Note that for every $x \in X$, the pair $(t,x) \in X \times X$ induces a corresponding piecewise linear function (linear spline)

$$f_{(t,x)}: [t_1, t_n] \to \mathbb{R}: \tau \mapsto x_i + (x_{i+1} - x_i) \frac{\tau - t_i}{t_{i+1} - t_i}, \tag{5}$$

where $\tau \in [t_i, t_{i+1}]$ and $i \in \{1, \ldots, n-1\}$, which passes through the points $\{(t_i, x_i) \in \mathbb{R}^2 | i \in I\}$. The set of constraints mentioned in (4) will involve the function $f_{(t,x)}$. Several types of constraints may be used within a design constraint set:

interpolation constraints: For a given subset I of $\{1, \ldots, n\}$, the entries $x_i$ are prescribed: $(\forall i \in I) f_{(t,x)}(t_i) = y_i$. This is an interpolation problem for the points $\{(t_i, y_i) \in \mathbb{R}^2 | i \in I\}$.

slope constraints: For a given subset I of $\{1, \ldots, n-1\}$ and for every $i \in I$, the slope $$s_i := \frac{x_{i+1} - x_i}{t_{i+1} - t_i} \tag{6}$$

of $f_{(t,x)}|_{[t_i, t_{i+1}]}$ must lie in a given subset of $\mathbb{R}$.

curvature constraints: For a given subset I of $\{1, \ldots, n-2\}$ and for every $i \in I$, $|s_{i+1} - s_i|$, the distance between the slopes $s_i$ and $s_{i+1}$ of two adjacent intervals $[t_i, t_{i+1}]$ and $[t_{i+1}, t_{i+2}]$, must lie in a given subset of $\mathbb{R}$.

Exemplary Instance in Road Design

The problem (e.g., equations (3)-(4)) introduced above and its solutions have several direct applications in engineering and computer-assisted design. For instance, an engineer may want to verify the feasibility of a design, or adapt the design according to the constraints. Examples drawn from Computer-Assisted Design (CAD) include designs for roadway profiles, pipe layouts, fuel lines in automotive designs such as cars and airplanes, overhead power lines, chairlifts, cable cars, and duct networks.

As described above, it is desirable to automate the design of road alignments. A road alignment is represented by the centerline of the road, which is idealized as a (generally) nonlinear, smooth curve in $\mathbb{R}^3$. To facilitate construction drawings, civil engineers reduce the three-dimensional road design to two two-dimensional parts, horizontal and vertical.

Figure 3:
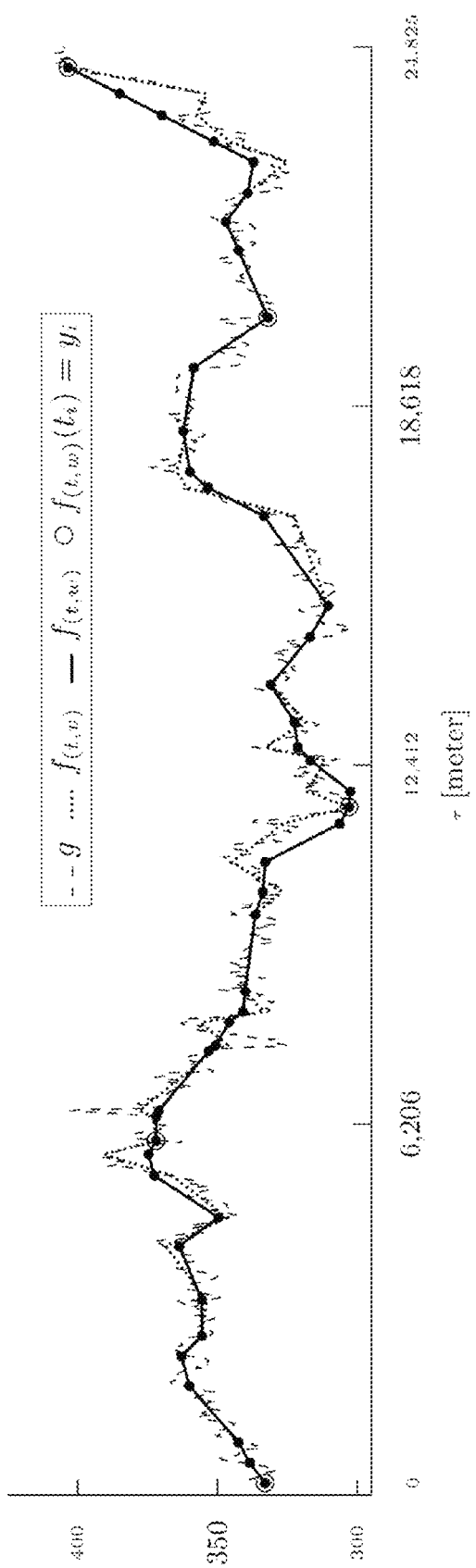
FIG. 3 illustrates the vertical profiles of a ground profile g, initial road design $f_{(t,v)}$, and final road design $f_{(t,w)}$ for a highway design near Kelowna, B.C., Canada in accordance with one or more embodiments of the invention.

The horizontal alignment is the plan (or map) view of the road. FIG. 3 illustrates the vertical profiles of a ground profile g, initial road design $f_{(t,v)}$, and final road design $f_{(t,w)}$ for a highway design near Kelowna, B.C., Canada in accordance with one or more embodiments of the invention. In the vertical view, the ground profile g: $[t_1, t_n] \to \mathbb{R}$ provides the elevation values of the existing ground along the centerline (see the dashed curve in FIG. 3). Since earthwork operations such as cuts and fills are expensive items in road construction, a civil engineer tries to find a road profile represented by a linear spline $f_{(t,x)}$ that follows g as closely as possible.

In FIG. 3, the solution was found with a particular projection method called Dykstra's method, using a design speed of 130 km/h, and a maximum slope of 4%. (These engineering constraints translate into a specific set of slope and interpolation constraints.)

Design constraints imposed on $f_{(t,x)}$ by the engineer or by civil design standards such as those published by the American Association of State Highway and Transportation Officials (AASHTO) [1] include the following:

At a certain station $t_i$, the engineer may have to fix the elevation $x_i$ to allow for construction of an intersection with an existing road that crosses the new road at $t_i$. This corresponds to the (mathematically affine) interpolation constraint described above.

For safety reasons and to ensure good traffic flow, AASHTO requires that the slope between two stations $t_i$ and $t_{i+1}$ is bounded above and below. These are the (mathematically convex) slope constraints described above.

In a road profile, engineers fit a (usually parabolic) curve at the point of intersection of two line segments. The curvature depends on the grade change of the line segments and influences the vertical acceleration of a vehicle, as well as the stopping sight distance. AASHTO requires bounds on the slope change. This corresponds to the (mathematically convex) curvature constraint described above.

In some cases, the engineer requires a minimum drainage grade to allow flow and avoid catchment of storm water. These (mathematically challenging nonconvex) slope constraints are discussed in further detail below.

The starting spline for a road profile (see the dotted curve in FIG. 3) may be denoted by:

$f_{(t,v)}$, where $t = (t_1, \ldots, t_n) \in X$ and $v = (v_1, \ldots, v_n) \in X$. \hfill (7)

In practice, the starting spline could simply be the connected line segments for the interpolation constraint, or it could be generated from the ground profile g by using Bellman's method (see [3] and [5] for details). In either case, one may assume that t is given and fixed, and that one needs to decide whether or not $f_{(t,v)}$ is feasible with respect to the aforementioned constraints. If v leads to a feasible spline, then the process id complete; otherwise, $w \in X$ should be found such that the new road spline $f_{(t,w)}$ (see the solid line in FIG. 3) satisfies the design constraints. Ideally, $f_{(t,w)}$ is close to the ground profile represented by (t, v). Finally, if there is no $w \in X$ making the problem feasible, then such a condition should be detected through some suitable measure.

In view of the above, there are numerous constraints that may create obstacles in the context of road design. Fortunately, the constraints have sufficient structure can be taken advantage of and it may be demonstrated that the constraints parallelize which allows the problems/obstacles to be reduced to six constraint sets, each of which admits a closed form projection formula. These projections can then be used in conjunction with projection methods to solve the underlying feasibility problem.

Constraints and Projection Operators

Projection onto a General Convex Set

In this section, the constraints encountered in road design are made mathematically precise. Almost all of these constraints turn out to lead to sets that are convex and closed. Recall that a set C is convex if it contains all line segments between each pair taken from C:

$$(\forall c_0 \in C)(\forall c_1 \in C)(\forall \lambda \in [0,1])(1-\lambda)c_0 + \lambda c_1 \in C. \quad (8)$$

If C is a nonempty closed convex subset of X, then for every x∈X, the optimization problem $$d(x, C) := \min_{c \in C} \|x - c\|, \quad (9)$$

which concerns the computation of the distance d(x,C) from x to the set C, has a unique solution, denoted by $P_C x$ and is called the projection of x onto C. The vector $P_C x$ is characterized by two properties, namely $$P_C x \in C \text{ and } (\forall c \in C)\langle c - P_C x, x - P_C x \rangle \leq 0. \quad (10)$$

The induced operator $P_C: X \to C$ is the projection operator or projector onto C. There are several examples that allow one to write down the projector in closed form or to approximate $P_C$ provided C is the intersection of finitely many simple closed convex sets (see, e.g., [2, Chapters 28 and 29]). In a road design application, it is fortunately possible to obtain explicit formulas. As described below, these formulas may be made as convenient as possible for software implementation. Such formulas may be obtained for each of the three types of constraints.

Interpolation Constraints

It may be assumed that I is a set such that $$\{1,n\} \subseteq I \subseteq \{1,2,\ldots,n\}, \text{ and } y = (y_i) \in \mathbb{R}^I \quad (11)$$

is given. Set $$Y := \{x = (x_1, \ldots, x_n) \in X \mid (\forall i \in I) x_i = y_i\}. \quad (12)$$

The closed set Y is an affine subspace, i.e., $(\forall y \in Y)(\forall z \in Y)(\forall \lambda \in \mathbb{R})(1-\lambda)y + \lambda z \in Y$; in particular, Y is convex. For convenience, the explicit formula for the projection onto Y may be recorded.

Interpolation Constraint Projector Proposition

The projector onto Y is given by $$P_Y: X \to X \quad (13)$$

$$(x_1, x_2, \ldots, x_n) \mapsto (c_1, c_2, \ldots, c_n), \quad (14)$$

$$\text{where } c_i = \begin{cases} y_i, & \text{if } i \in I; \\ x_i, & \text{if } i \notin I. \end{cases}$$

Slope Constraints

One may start with a simple special case that will also be useful in handling general slope constraints. To this end, let i∈{1, 2, . . . , n−1}. The constraint set $S_i$ imposes that the absolute value of the slope $f_{(t,x)}$ for the interval $[t_i, t_{i+1}]$ is bounded above, i.e., there exists $\alpha_i \geq 0$ such that $$S_i := \{x = (x_1, \ldots, x_n) \in \mathbb{R}^n \mid |x_{i+1} - x_i| \leq \alpha_i\} \quad (15)$$

Indeed, if the actual maximum absolute slope is $\sigma_i \geq 0$, then, setting $\alpha_i = \sigma_i |t_{i+1} - t_i|$, one may note that $$\left|\frac{x_{i+1} - x_i}{t_{i+1} - t_i}\right| \leq \sigma_i \Leftrightarrow |x_{i+1} - x_i| \leq \alpha_i \Leftrightarrow \pm(x_{i+1} - x_i) \leq \alpha_i. \quad (16)$$

$$\Leftrightarrow \pm \langle e_{i+1} - e_i, x \rangle \leq \alpha_i \quad (17)$$

$$\Leftrightarrow -\alpha_i \leq \langle e_{i+1} - e_i, x \rangle \leq \alpha_i, \quad (18)$$

where $e_i$ and $e_{i+1}$ denote the standard unit vectors in X (with the number 1 in position i and i+1, respectively, and zeros elsewhere). The last characterization reveals that $S_i$ is the intersection of two halfspaces whose boundary hyperplanes are orthogonal to $e_{i+1} - e_i$. In particular, $S_i$ is a closed convex subset of X. Using e.g., [2, Example 28.17], one obtains for every x∈X, $$P_{S_i} x = \quad (19)$$

$$\begin{cases} x + \dfrac{-\alpha_i - \langle e_{i+1} - e_i, x \rangle}{\|e_{i+1} - e_i\|^2}(e_{i+1} - e_i), & \text{if } \langle e_{i+1} - e_i, x \rangle < -\alpha_i; \\ x, & \text{if } -\alpha_i \leq \langle e_{i+1} - e_i, x \rangle \leq \alpha_i; \\ x + \dfrac{\alpha_i - \langle e_{i+1} - e_i, x \rangle}{\|e_{i+1} - e_i\|^2}(e_{i+1} - e_i), & \text{if } \langle e_{i+1} - e_i, x \rangle > \alpha_i. \end{cases}$$

This formula shows that $(P_{S_i} x)_j = x_j$, for every $j \in I \setminus \{i, i+1\}$. Thus, the only entries that possibly change after executing $P_{S_i}$ are in positions i and i+1. After some simplification, one obtains for these entries the formula:

$$((P_{S_i} x)_i, (P_{S_i} x)_{i+1}) = \quad (20)$$

$$\begin{cases} \frac{1}{2}(x_i + x_{i+1} + \alpha_i, x_i + x_{i+1} - \alpha_i), & \text{if } x_i - x_{i+1} > \alpha_i; \\ (x_i, x_{i+1}), & \text{if } |x_{i+1} - x_i| \leq \alpha_i; \\ \frac{1}{2}(x_i + x_{i+1} - \alpha_i, x_i + x_{i+1} + \alpha_i), & \text{if } x_{i+1} - x_i > \alpha_i. \end{cases}$$

It may be noted that $$x \notin S_i \Rightarrow (P_{S_i} x)_i \neq x_i \text{ and } (P_{S_i} x)_{i+1} \neq x_{i+1}; \quad (21)$$

Furthermore, if $\alpha_i = +\infty$, i.e., no slope constraint, then (20) is valid as well.

Now one may examine the general case. The existence of a vector $a = (\alpha_i) \in \mathbb{R}_+^{n-1}$ is assumed such that the constraint set is:

$$S = \cap_{i \in \{1, \ldots, n-1\}} S_i = \{(x_1, \ldots, x_n) \in \mathbb{R}^n \mid (\forall i \in \{1, \ldots, n-1\}) |x_{i+1} - x_i| \leq \alpha_i\}, \quad (22)$$

where $S_i$ is defined in (15). While an explicit formula is obtained to deal with a single slope constraint (see (20)), one is unaware of a corresponding formula for $P_S$. Furthermore, since $P_{S_i}$ possibly modifies the vector in positions i and i+1 (but not elsewhere), one cannot use (20) for the sets $S_i$ and $S_{i+1}$ concurrently because their projections possibly modify positions (i, i+1) and (i+1, i+2) (see (21)), but not necessarily in a consistent manner at position i+1. However, by combining the n−1 slope constraints according to parity of indices, i.e., by setting $$S_{even} := \cap_{i \in \{1, \ldots, n-1\} \cap (2\mathbb{N})} S_i, \text{ and } S_{odd} := \cap_{i \in \{1, \ldots, n-1\} \cap (2\mathbb{N})} S_i, \quad (23)$$

one may see that $$S = S_{even} \cap S_{odd} \quad (24)$$

can be written as the intersection of just two constraint sets. Furthermore, (20) yields the fully parallel update formulas:

Convex Slope Constraint Projector Proposition

For every $x \in X$, the projectors onto $S_{even}$ and $S_{odd}$ are given by $$P_{S_{even}}x = (x_1, (P_{S_2}x)_2, (P_{S_2}x)_3, (P_{S_4}x)_4, (P_{S_4}x)_5, \ldots) \in X, \quad (25)$$

where the last entry in (25) is $x_n$ if n is even; and $$P_{S_{odd}}x = ((P_{S_1}x)_1, (P_{S_1}x)_2, (P_{S_3}x)_3, (P_{S_3}x)_4, \ldots) \in X, \quad (26)$$

where the last entry in (26) is $x_n$ if n is odd.

The constraints making up the aggregated slope constraint are very special polyhedra, namely "strips", i.e., the intersection of two halfspaces with opposing normal vectors. This motivates the technique of not just projecting onto these sets but rather inside them: either one reflects into the strip, or (if the strip is too distant) the corresponding midpoint of the strip is jumped to. The formula for this operator may be recorded.

Intrepid Slope Constraint Projectors

The intrepid counterpart of (20), is (here sgn denotes the signum function)

$$(x_i, x_{i+1}) \mapsto \quad (27)$$

$$\begin{cases} \frac{1}{2}(x_i + x_{i+1}, x_i + x_{i+1}), & \text{if } |x_i - x_{i+1}| > 2\alpha_i; \\ (x_i, x_{i+1}), & \text{if } |x_{i+1} - x_i| \leq \alpha_i; \\ (x_{i+1}, x_i) + \text{sgn}(x_{i+1} - x_i)(-\alpha_i, \alpha_i) & \text{if } \alpha_i < |x_i - x_{i+1}| < 2\alpha_i. \end{cases}$$

These operators lead to the intrepid counterpart of (2.2).

Curvature Constraints

Again, a simple special case is explained first that will also be useful in handling the general curvature constraints. To this end, let $i \in \{1, \ldots, n-2\}$. The constraint requires that the difference of consecutive slopes is bounded above and below. Hence there exists $\gamma_i \in \mathbb{R}$ and $\delta_i \in \mathbb{R}$ such that $\gamma_i \geq \delta_i$ and $$C_i := \left\{ x = (x_1, \ldots, x_n) \in \mathbb{R}^n \,\Big|\, \gamma_i \geq \frac{x_{i+2} - x_{i+1}}{t_{i+2} - x_{i+1}} - \frac{x_{i+1} - x_i}{t_{i+1} - t_i} \geq \delta_i \right\}. \quad (28)$$

Set $$\tau_i := t_{i+1} - t_i, \ \tau_{i+1} := t_{i+2} - t_{i+1}, \text{ and } u_i := \tau_{i+1}e_i - (\tau_i + \tau_{i+1})e_{i+1} + \tau_i e_{i+2}. \quad (29)$$

Then $\tau_i > 0$, $\tau_{i+1} > 0$, and for every $x \in X$, $$x \in C_i \Leftrightarrow \gamma_i \tau_{i+1} \tau_i \geq \langle u_i, x \rangle \geq \delta_i \tau_{i+1} \tau_i. \quad (30)$$

Again, one may note that $C_i$ is a closed convex polyhedron and by e.g. [2, Example 28.17], one obtains:

$$P_{C_i} : x \mapsto \begin{cases} x + \frac{\delta_i \tau_i \tau_{i+1} - \langle u_i, x \rangle}{\|u_i\|^2} u_i, & \text{if } \langle u_i, x \rangle < \delta_i \tau_i \tau_{i+1}; \\ x, & \text{if } \delta_i \tau_i \tau_{i+1} \leq \langle u_i, x \rangle \leq \gamma_i \tau_i \tau_{i+1}; \\ x + \frac{\gamma_i \tau_i \tau_{i+1} - \langle u_i, x \rangle}{\|u_i\|^2} u_i, & \text{if } \gamma_i \tau_i \tau_{i+1} < \langle u_i, x \rangle. \end{cases} \quad (31)$$

Since $u_i \in \text{span}\{e_i, e_{i+1}, e_{i+2}\}$, it follows that $$\{j \in \{1, \ldots, n\} \,|\, x_j \neq (P_{C_i}x)_j\} \subseteq \{i, i+1, i+2\}. \quad (32)$$

One may now turn to the general curvature constraints. One assumes the existence of a vector $c = (\gamma_i) \in \mathbb{R}^{n-2}$ and $d = (\delta_i) \in \mathbb{R}^{n-2}$ such that the constraint set is $$C = \bigcap_{i \in \{1, \ldots, n-2\}} C_i \quad (33)$$

$$= \left\{ (x_1, \ldots, x_n) \in X \,\Big|\, (\forall i \in \{1, \ldots, n-2\}) \gamma_i \geq \frac{x_{i+2} - x_{i+1}}{t_{i+2} - t_{i+1}} - \frac{x_{i+1} - x_i}{t_{i+1} - t_i} \geq \delta_i \right\}. \quad (34)$$

Because of (32), these n-2 constraints may be aggregated into three constraint sets that allow projections in closed form. To this end, one sets:

$$(\forall j \in \{1,2,3\}) C_{[j]} := \bigcap_{i \in \{1, \ldots, n-2\} \cap (j+3\mathbb{N})} C_i \quad (35)$$

so that $$C = C_{[1]} \cap C_{[2]} \cap C_{[3]}. \quad (36)$$

Combined with (31), one obtains the following.

Curvature Constraint Projector Proposition

For every $x \in X$, the projectors onto $C_{[1]}$, $C_{[2]}$, and $C_{[3]}$ are given $$P_{C_{[1]}}x = ((P_{C_1}x)_1, (P_{C_1}x)_2, (P_{C_1}x)_3, (P_{C_4}x)_4, (P_{C_4}x)_5, (P_{C_4}x)_6, \ldots), \quad (37)$$

$$P_{C_{[2]}}x = (x_1, (P_{C_2}x)_2, (P_{C_2}x)_3, (P_{C_2}x)_4, (P_{C_5}x)_5, (P_{C_5}x)_6, (P_{C_5}x)_7, \ldots), \quad (38)$$

$$P_{C_{[3]}}x = (x_1, x_2, (P_{C_3}x)_3, (P_{C_3}x)_4, (P_{C_3}x)_5, (P_{C_6}x)_6, (P_{C_6}x)_7, (P_{C_6}x)_8, \ldots), \quad (39)$$

respectively, where each $P_{C_i}$ is given by (31).

The intrepid counterpart can then be recorded.

Intrepid Curvature Constraint Projectors Proposition

The intrepid counterpart of (31) is $$x \mapsto \quad (40)$$

$$\begin{cases} x - \frac{\langle u_i, x \rangle - \tau_i \tau_{i+1}(\delta_i + \gamma_i)/2}{\|u_i\|^2} u_i, & \text{if } \langle u_i, x \rangle < \tau_i \tau_{i+1}(3\delta_i - \gamma_i)/2; \\ x - 2\frac{\langle u_i, x \rangle - \delta_i \tau_i \tau_{i+1}}{\|u_i\|^2} u_i, & \text{if } \tau_i \tau_{i+1}(3\delta_i - \gamma_i)/2 \leq \langle u_i, x \rangle < \delta_i \tau_i \tau_{i+1}; \\ x, & \text{if } \delta_i \tau_i \tau_{i+1} \leq \langle u_i, x \rangle \leq \gamma_i \tau_i \tau_{i+1}; \\ x - 2\frac{\langle u_i, x \rangle - \gamma_i \tau_i \tau_{i+1}}{\|u_i\|^2} u_i, & \text{if } \gamma_i \tau_i \tau_{i+1} < \langle u_i, x \rangle \leq \tau_i \tau_{i+1}(3\gamma_i - \delta_i)/2; \\ x - \frac{\langle u_i, x \rangle - \tau_i \tau_{i+1}(\delta_i + \gamma_i)/2}{\|u_i\|^2} u_i, & \text{if } \tau_i \tau_{i+1}(3\gamma_i - \delta_i)/2 < \langle u_i, x \rangle. \end{cases}$$

These counterparts induce the intrepid variant of (37).

The Convex Feasibility Problem

The convex feasibility problem motivated by road design is to find a point in $$C := Y \cap S_{even} \cap S_{odd} \cap C_{[1]} \cap C_{[2]} \cap C_{[3]}, \quad (41)$$

where the sets on the right side are defined in (12), (23), and (35). Note that explicit formulas are available for all six projectors (see the above propositions). Moreover, intrepid variants of the projectors onto the five constraint sets $S_{even}$, $S_{odd}$, $C_{[1]}$, $C_{[2]}$, and $C_{[3]}$ are also available (e.g., see the above propositions). There is no fundamentally different intrepid variant of $P_Y$ because the interior of the affine subspace Y is empty.

Feasibility Problems and Projection Methods

In this section, a selection of projection methods for solving feasibility problems are presented. To this end, let $m \in \{2, 3, \ldots\}$ and $C_1, \ldots, C_m$ be nonempty closed convex subsets of X.

The m-Set Feasibility Problem and its Reduction to Two Sets

The aim is to $$\text{find } x \in C := C_1 \cap \ldots \cap C_m \neq \emptyset, \quad (42)$$

or, even more ambitiously, to compute $$P_C v \quad (43)$$

for some given point $v \in X$. Of course, one has the concrete scenario (41) described above, where m=6, in mind; however, the discussion in this section is not limited to that particular instance.

Projection methods solve (42) by generating a sequence of vectors by using the projectors $P_{C_1}, \ldots, P_{C_m}$ onto the individual sets. As described above, these projectors are available for a variety of constraints appearing in practical applications. Before the algorithms are catalogued, it may be noted that some algorithms work intrinsically only with two constraint sets. Because m may not be large, this turns out to be not a handicap at all as one can reformulate (42) in a product space in the following fashion: In the Hilbert product space $$X := X^m, \quad (44)$$

equipped with $$\langle x, y \rangle = \Sigma_{i=1}^m \langle x_i, y_i \rangle \text{ and } \|x\| = \sqrt{\Sigma_{i+1}^m \|x_i\|^2}, \quad (45)$$

where $x = (x_1, \ldots, x_m)$ and $y = (y_1, \ldots, y_m)$ belong to X, one considers the Cartesian product of the constraints together with the diagonal in X, i.e., $$C := C_1 \times \ldots \times C_m \text{ and } D := \{(x, \ldots, x) \in X | x \in X\}. \quad (46)$$

Then for every $x \in X$, the key equivalence is obtained:

$$x \in C \Leftrightarrow (x, \ldots, x) \in C \cap D; \quad (47)$$

thus, the original m-set feasibility problem (42) in X reduces to two-set feasibility problem for the sets C and D in X. This approach is viable because the projectors onto C and D are given explicitly by:

$$P_C : (x_1, \ldots, x_m) \mapsto (P_{C_1} x_1, \ldots, P_{C_m} x_m) \quad (48)$$

and by $$P_D : (x_1, \ldots, x_m) \mapsto (y, \ldots, y), \quad (49)$$

where $$y = \frac{1}{m}(x_1 + \ldots + x_m),$$

Exemplary Projection Methods

In this subsection, some examples of projection methods are described. Each of these methods produces a sequence that converges—sometimes after applying a suitable operator—to a point in C provided that $C \neq \emptyset$ (and perhaps an additional assumption is satisfied).

Note that numerous generalizations of projection methods may be known. However, such methods typically involve additional parameters (e.g., weights and relaxation parameters).

In embodiments of the invention, one can employ any projection method, or combinations, or compositions of projection methods. Only a small subset of all potential/possible projection methods are described herein.

While these methods are generally not able to find $P_C v$, they may lead to feasible solutions that are "fairly close" to $P_C v$ provided the starting point is chosen to be v.

One exemplary projection method that may be used is that of cyclic projections.

Cyclic Projections (CycP))

Set $x_0 = v$ and update $$(\forall k \in \mathbb{N}) x_{k+1} := T x_k, \text{ where } T := P_{C_m} P_{C_{m-1}} \ldots P_{C_1}. \quad (50)$$

A modern variant of CycP replaces the projectors in (50) by intrepid counterparts when available.

Cyclic Intrepid Projections (CycIP))

Set $x_0 = v$ and update $$(\forall k \in \mathbb{N}) x_{k+1} := T x_k, \text{ where } T := R_m R_{m-1} \ldots R_1, \quad (51)$$

where each $R_i$ is either an intrepid counterpart of $P_{C_i}$ (if available), or $P_{C_i}$ itself (if there is no intrepid counterpart).

The next method is different from the previous ones in two aspects: First, it truly operates in X and thus has increased storage requirements—fortunately, m is small in an application of embodiments of the invention so this is of no concern when dealing with (41). Second, the sequence of interest is actually different and derived from another sequence that governs the iteration.

Douglas-Rachford (D-R)

Set $x_0 = (v, \ldots, v) \in X = X^m$. Given $k \in \mathbb{N}$ and $x_k = (x_{k,1}, \ldots, x_{k,m}) \in X$, update to $x_{k+1} = (x_{k+1,1}, \ldots, x_{k+1,m})$, where $$\bar{x}_k = \frac{1}{m} \sum_{i=1}^m x_{k,i} \quad (52)$$

and $$(\forall i \in \{1, \ldots, m\}) x_{k+1,i} = x_{k,i} - x_{k,i} - \bar{x}_k + P_{C_i}(2\bar{x}_k - x_{k,i}). \quad (53)$$

The sequence of interest is not $(x_{k})_{k \in \mathbb{N}}$ but rather $(\bar{x}_k)_{k \in \mathbb{N}}$.

There are many other methods of this type (see, e.g., [2]); including Dykstra's method, parallel projections, and string-averaging projections. Often these methods have parameters that can be adjusted to improve the speed of convergence.

Nonconvexity

In this section, remarks are provided on the possible absence of convexity.

Nonconvex Slope Constraints

A case with nonconvex constraints is considered. This type of constraint does occur frequently in applications; however, convergence of the iterates is guaranteed at best only when the starting point is already sufficiently close to the set of solutions. The convex constraints described above are used with one crucial modification: The slope constraint (15) is tightened by additionally imposing a minimum absolute value slope, i.e., the existence of two vectors $a = (\alpha_i)$ and $b = (\beta_i)$ in $\mathbb{R}_+^{n-1}$ are assumed such that $$(\forall i \in I) S_i := \{x = (x_1, \ldots, x_n) \in \mathbb{R}^n | \alpha_i \geq |x_{i+1} - x_i| \geq \beta_i\}. \quad (54)$$

Note that if $\beta_i > 0$, then $S_i$ is not convex. Analogously to (22), these sets are aggregated to obtain the general non-convex constraint set $$S = \bigcap_{i \in \{1, \ldots, n-1\}} S_i. \quad (55)$$

Let $i \in \{1, \ldots, n-1\}$ and $x \in X$. The counterpart of (20) is obtained and it may be noted that $P_{S_i} x$ is different from $x$ at most in positions $i$ and $i+1$, and $((P_{S_i}x)_i, (P_{S_i}x)_{i+1})$ $$= \begin{cases} \frac{1}{2}(x_i + x_{i+1} + \alpha_i, x_i + x_{i+1} - \alpha_i), & \text{if } x_{i+1} < x_i - \alpha_i; \\ (x_i, x_{i+1}), & \text{if } x_i - \alpha_i \leq x_{i+1} \leq x_i - \beta_i; \\ \frac{1}{2}(x_i + x_{i+1} + \beta_i, x_i + x_{i+1} - \beta_i), & \text{if } x_i - \beta_i < x_{i+1} \leq x_i; \\ \frac{1}{2}(x_i + x_{i+1} - \beta_i, x_i + x_{i+1} + \beta_i), & \text{if } x_i \leq x_{i+1} < x_i + \beta_i; \\ (x_i, x_{i+1}), & \text{if } x_i + \beta_i \leq x_{i+1} \leq x_i + \alpha_i; \\ \frac{1}{2}(x_i + x_{i+1} - \alpha_i, x_i + x_{i+1} + \alpha_i), & \text{if } x_i + \alpha_i < x_{i+1}. \end{cases} \quad (56)$$

This formula allows one to deal with the general case as described above. Thus, one may obtain the counterpart of the Convex Slope Constraint Projector Proposition described above.

The intrepid counterpart of (56) may be recorded:

$$\begin{cases} \frac{1}{2}\begin{pmatrix} x_i + x_{i+1} + \frac{1}{2}(\alpha_i + \beta_i), \\ x_i + x_{i+1} - \frac{1}{2}(\alpha_i + \beta_i) \end{pmatrix}, & \text{if } x_{i+1} < x_i + (\beta_i - 3\alpha_i)/2; \\ (x_{i+1} + \alpha_i, x_i - \alpha_i), & \text{if } x_i + (\beta_i - 3\alpha_i)/2 \leq x_{i+1} < x_i - \alpha_i; \\ (x_i, x_{i+1}), & \text{if } x_i - \alpha_i \leq x_{i+1} \leq x_i - \beta_i; \\ (x_{i+1} + \beta_i, x_i - \beta_i), & \text{if } -\beta_i < x_{i+1} \leq x_i + \min\{0, (\alpha_i - 3\beta_i)/2\}; \\ \frac{1}{2}\begin{pmatrix} x_i + x_{i+1} + \frac{1}{2}(\alpha_i + \beta_i), \\ x_i + x_{i+1} - \frac{1}{2}(\alpha_i + \beta_i) \end{pmatrix}, & \text{if } x_i + \frac{\alpha_i - 3\beta_i}{2} < x_{i+1} \leq x_i; \\ \frac{1}{2}\begin{pmatrix} x_i + x_{i+1} - \frac{1}{2}(\alpha_i + \beta_i), \\ x_i + x_{i+1} + \frac{1}{2}(\alpha_i + \beta_i) \end{pmatrix}, & \text{if } x_i < x_{i+1} \leq x_i + \frac{3\beta_i - \alpha_i}{2}; \\ (x_{i+1} - \beta_i, x_i + \beta_i), & \text{if } x_i + \max\{0, (3\beta_i - \alpha_i)/2\} \leq x_{i+1} < x_i + \beta_i; \\ (x_i, x_{i+1}), & \text{if } x_i + \beta_i \leq x_{i+1} \leq x_i + \alpha_i; \\ (x_{i+1} - \alpha_i, x_i + \alpha_i), & \text{if } x_i + \alpha_i < x_{i+1} \leq x_i + (3\alpha_i - \beta_i)/2; \\ \frac{1}{2}\begin{pmatrix} x_i + x_{i+1} - \frac{1}{2}(\alpha_i + \beta_i), \\ x_i + x_{i+1} + \frac{1}{2}(\alpha_i + \beta_i) \end{pmatrix}, & \text{if } x_i + (3\alpha_i - \beta_i)/2 < x_{i+1}. \end{cases} \quad (57)$$

There are at least 8 cases; however, the two cases in the middle arise if and only if $3\beta_i > \alpha_i$.

Logical Flow

Figure 4:
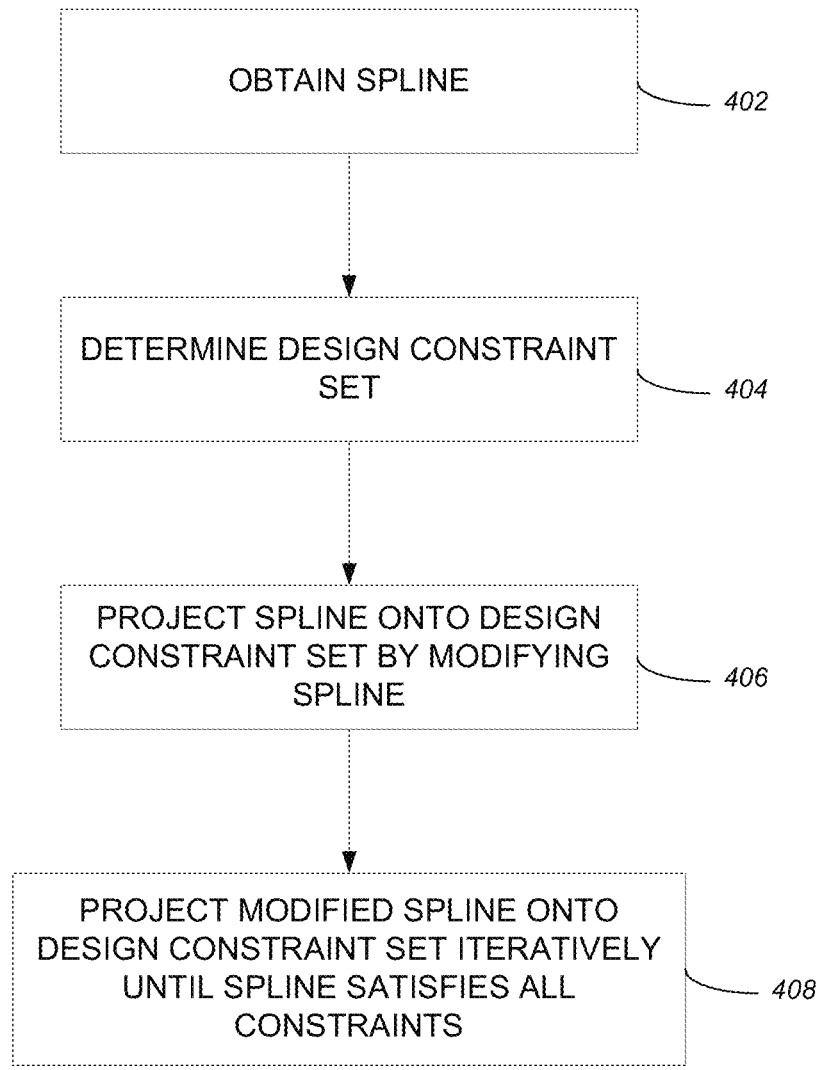
FIG. 4 illustrates the logical flow for modifying a spline in accordance with one or more embodiments of the invention.

FIG. 4 illustrates the logical flow for modifying a spline in accordance with one or more embodiments of the invention.

At step 402, a spline is obtained. The spline is a set of connected points. As described above, the set of connected points may be points of vertical interest (PVIs), ground points, or any other points that may be connected to form a spline. More specifically, embodiments of the invention are directed towards a civil engineering spline (i.e., a spline used in the context of civil engineering) which may represent a road, a railway, a pipeline, a utility cable, a transport cable (e.g., cable cars, cabins, chair lifts, t-bars), etc.

At step 404, a design constraint set is determined. The design constraint set may include various different types of constraints including an interpolation constraint, a slope constraint, and/or a curvature constraint. Each of these constraints is described below along with the specific method steps that are associated with each constraint during the projecting step of 406.

At step 406, the spline is projected onto the design constraint set which includes a modification of the spline (e.g., a modification/movement of the connected points in the spline).

At step 408, the modified spline is projected onto the design constraint set iteratively until the spline satisfies all of the constraints in the design constraint set.

Some exemplary constraints in the design constraint set (e.g., interpolation, slope, and curvature) along with the actions associated with the projection of the spline onto the specific constraints are described herein.

Interpolation Constraint

An interpolation constraint defines a fixed elevation for one or more of the connected points in a spline. The projecting of the spline onto the design constraint set modifies the spline by changing a first elevation of a first connected point to match the fixed elevation. In an exemplary use case, at a certain station along a road, an engineer may have to fix an elevation at a certain point to allow for construction of an intersection with an existing road that crosses the new road within a given distance of that point. In embodiments of the invention, where the point in question is at a different elevation than the required one, the design of the road spline is modified by changing the elevation of that point so that it matches the required elevation.

FIG. 5 illustrates an exemplary vertical road profile in accordance with one or more embodiments of the invention. The dashed line 502 represents a vertical profile of the existing ground. The solid line 504 represents a spline that reflects the vertical profile of a road. With an interpolation constraint, one of the connected points 506 is fixed such that the road 504 must pass through that point 506 to intersect with an existing road (profile not shown). Thus, in embodiments of the invention, the spline may represent a vertical road profile 504, where the connected point 506 having the fixed elevation defines an intersection point for an intersection between the vertical road profile 504 and an existing civil engineering infrastructure feature. Further, such an intersection is within a threshold distance of the existing civil engineering infrastructure feature. The existing civil engineering infrastructure feature may include a variety of features including another road, a lake, a cable, a railway, a feature that can be represented by a linear spline, etc.

Mathematically, the interpolation constraint may be represented using the following equation:

$$x_i = \begin{cases} y_i, & \text{if } i \in I; \\ x_i, & \text{otherwise.} \end{cases}$$

for n connected spline points 506, where $x_i$ is a current elevation of the connected point i, for $i=1, \ldots, n$, I is an index set referencing the connected points 506 that require a fixed elevation, and $y_i$ is the required fixed elevation for the connected point i.

Slope Constraint

A slope constraint defines a bound on a slope between two of the connected points. As an example, a bound may be a minimum required slope, an upper bound on the slope, and or a lower bound on the slope. When projecting the spline onto the design constraint set, the spline is modified by changing elevations of the two connected points to obtain a solution that satisfies the slope constraint.

In an exemplary road profile scenario, at a certain given PVI along the road, the engineer may have to respect a constraint on the slope to the next PVI. If the slope constraint is violated, then the two elevations are adjusted to obtain the nearest feasible solution satisfying the slope constraint by executing a projection operation. If no constraints are violated or considered, an engineer may adjust the two elevations to obtain another feasible solution that has the least change in elevation by executing a projection operation.

FIGS. 6A-6C illustrate different slope bounds that may be utilized as constraints in accordance with one or more embodiments of the invention. In FIG. 6A, the spline 602 has a defined slope. However, the slope of spline 602 exceeds the maximum slope (i.e., it is too steep). Accordingly, during the projection phase (i.e., step 406 of FIG. 4), the elevations of both connected points are modified so that the spline complies with the maximum slope constraint thereby resulting in spline 604. As an example, a maximum slope constraint may ensure that a road does not have an excessive grade (to accommodate certain vehicles).

In FIG. 6B, spline 606 has no slope at all (i.e., it is flat). A slope constraint may require a minimum slope such that the elevations of the connected points defining spline 606 are modified resulting in spline 608. A minimum slope may be required for drainage purposes such as on a road in Florida, a driveway, a man-made aqueduct, a pipeline, etc. Thus, the spline may represent a vertical road profile of a road and the bound on the slope is defined based on safety requirements for breaking, or traffic flow requirements for given design speeds, drainage requirements on a surface of the road, or flow requirements of waste water or drainage pipelines associated with the road.

In FIG. 6C, spline 610 has a slope value that is negative, wherein the value of the slope exceeds the maximum. Accordingly, the elevations of the connected points are modified resulting in spline 612.

In FIGS. 6A-6C, different slope constraints are illustrated, including a minimum slope constraint (FIG. 6A), an upper bound slope constraint (FIG. 6B), and a lower bound slope constraint (FIG. 6C).

Of note that with all slope constraints, the solution is selected by selecting a solution associated with a minimum distance, in a metric space, from the connected points to a solution set of connected points that satisfy the slope constraint. In other words, given a solution set of all connected points that comply with the slope constraint, the connected points that are selected from that solution set are those points having elevations that provide a minimum distance in metric space. As used herein, metric space refers to the mathematical concept of a set where a notion of distance (called a metric) between elements of the set is defined. To compute such a minimum distance, a distance function may be used that includes, but is not limited to, the Euclidean distance, rectilinear distance, Chebyshev distance, or any other metric. Thus, the distances between the connected points to points in the solution set may be computed are compared, with the minimum distance selected as the solution.

Mathematically, as described above, for n connected points in the spline, let $S_i$ be the solution set of connected points that satisfy the slope constraints between two connected points i and i+1. A projection $P_{S_i}$ that projects elevations $x_i$ and $x_{i+1}$ to the set $S_i$ is defined as:

$$P_{S_i}: x \begin{cases} \frac{1}{2}(x_i + x_{i+1} + \alpha_i, x_i + x_{i+1} - \alpha_i), & \text{if } x_i - x_{i+1} > \alpha_i; \\ (x_i, x_{i+1}), & \text{if } |x_{i+1} - x_i| \leq \alpha_i; \\ \frac{1}{2}(x_i + x_{i+1} - \alpha_i, x_i + x_{i+1} + \alpha_i), & \text{if } x_{i+1} - x_i > \alpha_i. \end{cases}$$

wherein, $\alpha_i$ is a vertical bound on an elevation difference between the two connected points that will satisfy the bound for the slope constraint.

In addition, in order to parallelize the execution of the projection, the set of slopes in the spline may be divided into two subsets. For the first subset, all of the slopes that start at even connected points/PVIs are picked, and for the second subset all of the slopes that start at odd connected points/PVIs are picked. This way, every connected point/PVI in a subset is changed only once in the projection. In other words, the projecting of the spline onto the design constraint set includes dividing the set of connected points into a first subset and a second subset, wherein the first subset contains all connected points that, starting with a first connected point, are spaced two points apart, and the second subset contains all connected points that, starting with a second connected point are spaced two points apart. Thereafter, all of the connected points in the first subset of connected points are projected onto the design constraint set in parallel. Similarly, all of the connected points in the second subset of connected points are projected onto the design constraint set in parallel.

As an alternative to the connected points reflecting a road spline, embodiments of the invention may provide that the connected points are existing ground points. When using existing ground points, a reference solution for the spline is obtained/acquired. The elevations of the connected points in the spline are modified with a projection-like operator that, if applied iteratively on the connected points, positions the connected points closer, using a distance measure in metric space, to the reference solution with each iteration. Stated mathematically, for n connected points in the spline, let $x_i$ be the elevation of a connected point i in the spline, and $z_i$ be the elevation for a connected point i in the reference solution for the spline. A projection-like operator that positions the connected points closer, using a Manhattan distance in Euclidean space, is defined as:

$$x_i = \begin{cases} x_i + \varepsilon \frac{z_i - x_i}{|z_i - x_i|}, & \text{if } |z_i - x_i| > \varepsilon \\ z_i, & \text{otherwise} \end{cases}$$

wherein, $\in$ is a tolerance value.

In an exemplary use case, an engineer may require a road profile that follows the ground profile as close as possible. The methods described herein may not guarantee that, as they aim for feasibility of the constraints only. Since iterative projection methods work also with other, projection-like operators, one can add a so-called "prox-operator" to approximate the existing ground profile. Given a reference solution, which in the infrastructure case is an existing ground profile, a prox-operator to approximate the ground profile as good as possible will move the connected spline points closer to the reference solution. If applied iteratively, it will move them closer in each iteration. However, used in an iterative method (e.g., as in step 408 of FIG. 4) with the other projections, the prox-operator may not move the connected spline points exactly to the reference solution, as the reference solution could violate the design constraints, and the projections (e.g., onto the design constraint set described herein) will prevent convergence to the reference solution.

Curvature Constraint

The curvature constraint specifies a maximum slope difference of a first slope and a second slope (between three connected points—referred to as a first connected point, a second connected point, and a third connected point). When projecting the spline onto the design constraint set, the projecting modifies the spline by changing a first elevation of the first connected point, a second elevation of the second connected point, and a third elevation of the third connected point to obtain a solution satisfying the curvature constraint.

In an exemplary road profile scenario, at a certain given PVI along the road, an engineer may have to respect constraints on the differences of the slopes to the previous and next PVI. In embodiments of the invention, if that constraint is violated, then the three elevations are adjusted to obtain the nearest feasible solution by executing a projection operation. If no constraints are violated or considered, the engineer may adjust the three elevations to obtain another feasible solution that has the least change in slopes by executing a projection operation.

Figure 7:
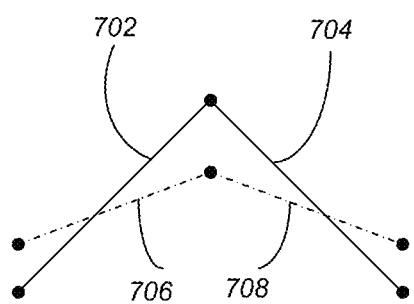
FIG. 7 illustrates a slope constraint in accordance with one or more embodiments of the invention.

FIG. 7 illustrates a slope constraint in accordance with one or more embodiments of the invention. The three connected points have two segments 702 and 704. A slope constraint may provide that the difference between the slopes of the two segments 702 and 704 cannot exceed a certain bound/threshold. In other words, the change in slope may be too abrupt. Accordingly, the elevations of the three points may be changed thereby resulting in modified spline having the two segments 706 and 708 that comply with the specified bounds.

In an exemplary use case, the spline represents a vertical road profile of a road and the maximum slope difference defines a maximum difference in road grades between two connecting sections (e.g., sections 702 and 704) of the road.

Similar to the slope constraint, the solution may be selected by selecting a solution associated with a minimum distance in a metric space, from the connected points to a solution set of connected points that satisfy the curvature constraint.

Mathematically, for n connected points in the spline, let C be a solution set of the connected points that satisfy the curvature constraints between three connected points i, i+1, and i+2. In addition, let $\tau_i := t_{i+1} - t_i$, $\tau_{i+1} := t_{i+2} - t_{i+1}$ and $u_i$ be a vector of length n with entries $u_i := [0, \ldots, 0, \tau_{i+1}, -\tau_i - \tau_{i+1}, \tau_i, 0, \ldots, 0]$. A projection $P_{C_i}$ that projects elevations $x_i$, $x_{i+1}$ and $x_{i+2}$ to the set C is defined as:

$$P_{C_i}: x \mapsto \begin{cases} x + \frac{\delta_i \tau_i \tau_{i+1} - \langle u_i, x \rangle}{\|u_i\|^2} u_i, & \text{if } \langle u_i, x \rangle < \delta_i \tau_i \tau_{i+1}; \\ x, & \text{if } \delta_i \tau_i \tau_{i+1} \leq \langle u_i, x \rangle \leq \gamma_i \tau_i \tau_{i+1}; \\ x + \frac{\gamma_i \tau_i \tau_{i+1} - \langle u_i, x \rangle}{\|u_i\|^2} u_i, & \text{if } \gamma_i \tau_i \tau_{i+1} < \langle u_i, x \rangle. \end{cases}$$

wherein, <u,x> is an inner product between u and x, ||u|| is a norm of a vector u, and δ and γ are bounds on a slope change between the first connected point, the second connected point, and the third connected point.

In addition, to parallelize the execution of the projection, the set of slopes may be divided into three subsets/groups: a first group contains all connected points that, starting with a first connected point, are spaced three points apart, and a second group contains all connected points that, starting with a second connected point, are spaced three points apart, and a third group contains all connected points that, starting with a third connected point, are spaced three points apart. Thereafter, all of the connected points in the first group of connected points may be projected onto the design constraint set in parallel. Similarly, all of the connected points in the second group of connected points may be projected onto the design constraint set in parallel, and all of the connected points in the third group of connected points may be projected onto the design constraint set in parallel.

Multiple Design Constraints

The logical flow described herein may also be followed when the design constraint set contains two or more constraints (e.g., the interpolation constraint, slope constraint, and curvature constraint). With such a constraint set, projections may be applied in a variety of manners iteratively until the solution set converges on a result that satisfies/complies with all of the constraints.

In other words, in addition to the interpolation constraint described above, the design constraint set may include a slope constraint that specifies a bound on a first slope between two of the connected points. If the design constraint set includes a slope constraint, the projecting step would also include the modification of the spline by changing elevations of the two connected points to obtain a solution satisfying the slope constraint. Further, the design constraint set may include a curvature constraint that specifies a maximum slope difference of a second slope (between a second connected point and a third connected point) and a third slope (between the third connected point and a fourth connected point). If the design constraint set includes the curvature constraint, the projection step would also include modifying the spline by changing a second elevation of the second connected point, a third elevation of the third connected point, and a fourth elevation of the fourth connected point to obtain a solution satisfying the curvature constraint.

To apply all different constraints, cyclical projection methods, parallel projection methods, or any other type of projection methods may be utilized. For example, in an exemplary use case with an initial civil engineering spline that represents a road, a railway, a pipeline, a utility cable, or a transport cable (e.g. cable cars, cabins, chair lifts, t-bars), embodiments of the invention may apply first the projection onto the interpolation constraint to satisfy all the fixed PVI requirements. With the newly obtained spline, embodiments of the invention may then apply the projection for the slope constraints (i.e., to satisfy all of the slope constraints). As described above, such a projection may first be performed on the even group of slopes, and then on the odd group of slopes.

The projections onto the slope constraints may invalidate the previous fixed PVI requirements (i.e., the interpolation constraint). Embodiments of the invention may then apply the curvature projections (e.g., first for groups of PVIs that start at the first position, following by the groups described above—e.g., a group starting with the second point and spaced 3 PVIs apart). However, such an application may invalidate the slope constraints again. Embodiments of the invention may then start with the fixed PVI constraint (i.e., the interpolation constraint) again and repeats the whole process iteratively. A general method to call projections in such a sequence is called a cyclic projection method and is known to converge to a solution that will satisfy all the constraints within a small tolerance. Embodiments of the invention make use of this cyclic projection method to find a feasible spline for a road, a railway, a pipeline, a utility cable, or a transport cable.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

While embodiments of the invention may be utilized in road design optimization (or as a feature for CAD desktop software for civil engineering), it is not limited to road profiles. In computer graphics and mathematics, a spline is a curve that is made up of piecewise polynomial functions. It is widely used to approximate complex shapes with a curve. Embodiments of the invention can be used on any given linear spline that needs to be adapted to the constraints described herein. In CAD, examples include designs for pipelines (e.g., pipe layouts in water networks), utility cables, transport cables (e.g., cable cars, cabins, chair lifts, t-bars, etc.), fuel lines in automotive designs such as airplanes and cars, duct networks for heating systems, railways, etc.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] American Association of State Highway and Transportation Officials, *A Policy on Geometric Design of Highways and Streets*, sixth edition, Washington, D.C., 2011.

[2] H. H. Bauschke and P. L. Combettes, *Convex Analysis and Monotone Operator Theory in Hilbert Spaces*, Springer, 2011.

[3] R. Bellman, On the approximation of curves by line segments using dynamic programming, *Comm. ACM* 4(6) (1961), 284.

[4] G. T. Herman and W. Chen, A fast algorithm for solving a linear feasibility problem with application to intensity-modulated radiation therapy, *Linear Algebra Appl.* 428 (2008), 1207-1217.

[5] V. R. Koch, Road Design Optimization, U.S. patent application Ser. No. 13/626,451, filed on Sep. 25, 2012.

What is claimed is:

1. A computer-implemented method for modifying a spline, comprising:

obtaining, in a computer, the spline, wherein the spline comprises a set of connected points, and wherein the spline is representative of a feature to be constructed outside of the computer and wherein the feature represented by the spline comprises a vertical road profile of a road;

determining, in the computer, a design constraint set comprising an interpolation constraint, wherein the interpolation constraint comprises a fixed elevation for one of the connected points;

projecting, in the computer, the spline onto the design constraint set, wherein the projecting comprises modifying the spline, by a minimum distance in a metric space, by mapping a first elevation of a first connected point of the set of connected points to match the fixed elevation of the design constraint set, and then moving the first elevation to the fixed elevation;

projecting, in the computer, the modified spline onto the design constraint set iteratively until the spline satisfies all constraints in the design constraint set; and generating, in the computer, a computer aided design (CAD) design of the feature represented by the spline, wherein the generating is based on the projecting steps; and providing the spline for constructing the road based on the spline.

2. The computer-implemented method of claim 1, wherein:

the connected point having the fixed elevation defines an intersection point for an intersection between the vertical road profile and an existing civil engineering infrastructure feature; and the intersection is within a threshold distance of the existing civil engineering infrastructure feature.

3. The computer-implemented method of claim 1, wherein:

$$x_i = \begin{cases} y_i, & \text{if } i \in I; \\ x_i, & \text{otherwise.} \end{cases}$$

for n connected spline points, where $x_i$ is a current elevation of the connected point i, for i=1, ..., n, I is an index set referencing the connected points that require a fixed elevation, and $y_i$ is the required fixed elevation for the connected point i.

4. The computer-implemented method of claim 1, wherein:

(a) the design constraint set further comprises a slope constraint;

(b) the slope constraint comprises a bound on a first slope between two of the connected points;

(c) the projecting of the spline onto the design constraint set further comprises modifying the spline by changing elevations of the two connected points to obtain a solution satisfying the slope constraint;

(d) the design constraint set further comprises further comprises a curvature constraint, wherein the curvature constraint comprises a maximum slope difference of a second slope and a third slope, wherein:

(1) the second slope is between a second connected point and a third connected point; and (2) the third slope is between the third connected point and a fourth connected point; and (e) the projecting of the spline onto the design constraint set comprises modifying the spline by changing a second elevation of the second connected point, a third elevation of the third connected point, and a fourth elevation of the fourth connected point to obtain a solution satisfying the curvature constraint.

5. A computer-implemented method for modifying a spline, comprising:

obtaining, in a computer, the spline, wherein the spline comprises a set of connected points, and wherein the spline is representative of a feature to be constructed outside of the computer, wherein the feature represented by the spline comprises a vertical road profile of a road;

determining, in the computer, a design constraint set comprising a slope constraint, wherein the slope constraint comprises a bound on a slope between two of the connected points;

projecting, in the computer, the spline onto the design constraint set, wherein the projecting comprises modifying the spline by changing elevations of the two connected points a minimum distance in a metric space to obtain a solution set of connected points satisfying the slope constraint;

projecting, in the computer, the modified spline onto the design constraint set iteratively until the spline satisfies all constraints in the design constraint set;

generating, in the computer, a computer aided design (CAD) design of the feature represented by the spline, wherein the generating is based on the projecting steps; and providing the spline for constructing the road based on the spline.

6. The computer-implemented method of claim 5 wherein:
the bound comprises a minimum require slope.

7. The computer-implemented method of claim 5 wherein:
the bound comprises an upper bound on the slope.

8. The computer-implemented method of claim 5 wherein:
the bound comprises a lower bound on the slope.

9. The computer-implemented method of claim 5, wherein the solution is selected by selecting a solution associated with the minimum distance, in the metric space, from the connected points to a solution set of connected points that satisfy the slope constraint.

10. The computer-implemented method of claim 5, wherein:
the bound on the slope between two connected profile points is defined based on safety requirements for breaking, or traffic flow requirements for given design speeds.

11. The computer-implemented method of claim 5, wherein:
the bound on the slope between the two connected points is based on drainage requirements on a surface of the road, or flow requirements of waste water or drainage pipelines associated with the road.

12. The computer-implemented method of claim 5, wherein:
for n connected points in the spline, let $S_i$ be the solution set of connected points that satisfy the slope constraints between two connected points i and i+1;
a projection $P_{Si}$ that projects elevations $x_i$ and $x_{i+1}$ to the set $S_i$ is defined as:

$$P_{S_i} : x \begin{cases} \frac{1}{2}(x_i + x_{i+1} + \alpha_i, x_i + x_{i+1} - \alpha_i), & \text{if } x_i - x_{i+1} > \alpha_i; \\ (x_i, x_{i+1}), & \text{if } |x_{i+1} - x_i| \leq \alpha_i; \\ \frac{1}{2}(x_i + x_{i+1} - \alpha_i, x_i + x_{i+1} + \alpha_i), & \text{if } x_{i+1} - x_i > \alpha_i. \end{cases}$$

wherein, $\alpha_i$ is a vertical bound on an elevation difference between the two connected points that will satisfy the bound for the slope constraint.

13. The computer-implemented method of claim 5 wherein the projecting the spline onto the design constraint set comprises:
dividing the set of connected points into a first subset and a second subset, wherein the first subset contains all connected points that, starting with a first connected point, are spaced two points apart, and the second subset contains all connected points that, starting with a second connected point are spaced two points apart;
projecting all of the connected points in the first subset of connected points onto the design constraint set in parallel; and
projecting all of the connected points in the second subset of connected points onto the design constraint set in parallel.

14. The computer-implemented method of claim 5 wherein the connected points comprise existing ground points and the method further comprises:
(a) obtaining a reference solution for the spline;
(b) modifying the elevations of the connected points in the spline with a projection-like operator that, if applied iteratively on the connected points, positions the connected points closer, using a distance measure in metric space, to the reference solution with each iteration.

15. The computer-implemented method of claim 14 wherein
for n connected points in the spline, let $x_i$ be the elevation of a connected point i in the spline, and $z_i$ be the elevation for a connected point i in the reference solution for the spline; and
a projection-like operator that positions the connected points closer, using a Manhattan distance in Euclidean space, is defined as:

$$x_i = \begin{cases} x_i + \varepsilon \frac{z_i - x_i}{|z_i - x_i|}, & \text{if } |z_i - x_i| > \varepsilon \\ z_i, & \text{otherwise} \end{cases}$$

wherein, $\varepsilon$ is a tolerance value.

16. A computer-implemented method for modifying a spline, comprising:
(a) obtaining, in a computer, the spline, wherein the spline comprises a set of connected points, and wherein the spline is representative of a feature to be constructed outside of the computer, wherein the feature represented by the spline comprises a vertical road profile of a road;
(b) determining, in the computer, a design constraint set comprising a curvature constraint, wherein the curvature constraint comprises a maximum slope difference of a first slope and a second slope, wherein:
(1) the first slope is between a first connected point and a second connected point; and
(2) the second slope is between the second connected point and a third connected point;
(c) projecting, in the computer, the spline onto the design constraint set, wherein the projecting comprises modifying the spline a minimum distance in a metric space by changing a first elevation of the first connected point, a second elevation of the second connected point, and a third elevation of the third connected point to obtain a solution satisfying the curvature constraint;
(d) projecting, in the computer, the modified spline onto the design constraint set iteratively until the spline satisfies all constraints in the design constraint set; and
(e) generating, in the computer, a computer aided design (CAD) design of the feature represented by the spline, wherein the generating is based on the projecting steps; and
(f) providing the spline for constructing the road based on the spline.

17. The computer-implemented method of claim 16, wherein:
the maximum slope difference defines a maximum difference in road grades between two connecting sections of the road.

18. The computer-implemented method of claim 16, wherein the solution is selected by selecting a solution associated with the minimum distance in the metric space, from the connected points to a solution set of connected points that satisfy the curvature constraint.

19. The computer-implemented method of claim 16, wherein for n connected points in the spline, let $C_i$ be a solution set of the connected points that satisfy the curvature constraints between three connected points i, i+1, and i+2;

let $\tau_i := t_{i+1} - t_i$, $\tau_{i+1} := t_{i+2} - t_{i+1}$ and $u_i$ be a vector of length n with entries $u_i := [0, \ldots, 0, \tau_{i+1}, -\tau_i - \tau_{i+1}, \tau_i, 0, \ldots, 0]$;

a projection $P_{C_i}$ that projects elevations $x_i$, $x_{i+1}$ and $x_{i+2}$ to the set $C_i$ is defined as:

$$P_{C_i}: x \mapsto \begin{cases} x + \dfrac{\delta_i \tau_i \tau_{i+1} - \langle u_i, x \rangle}{\|u_i\|^2} u_i, & \text{if } \langle u_i, x \rangle < \delta_i \tau_i \tau_{i+1}; \\ x, & \text{if } \delta_i \tau_i \tau_{i+1} \leq \langle u_i, x \rangle \leq \gamma_i \tau_i \tau_{i+1}; \\ x + \dfrac{\gamma_i \tau_i \tau_{i+1} - \langle u_i, x \rangle}{\|u_i\|^2} u_i, & \text{if } \gamma_i \tau_i \tau_{i+1} < \langle u_i, x \rangle. \end{cases}$$

wherein, <u,x> is an inner product between u and x, ‖u‖ is a norm of a vector u, and δ and γ are bounds on a slope change between the first connected point, the second connected point, and the third connected point.

20. The computer-implemented method of claim 16, further comprising:

dividing the set of connected points into three groups, wherein a first group contains all connected points that, starting with a first connected point, are spaced three points apart, and a second group contains all connected points that, starting with a second connected point, are spaced three points apart, and a third group contains all connected points that, starting with a third connected point, are spaced three points apart;

projecting all of the connected points in the first group of connected points onto the design constraint set in parallel;

projecting all of the connected points in the second group of connected points onto the design constraint set in parallel; and projecting all of the connected points in the third group of connected points onto the design constraint set in parallel.

* * * * *